(12) United States Patent
Miyanaga et al.

(10) Patent No.: US 9,997,766 B2
(45) Date of Patent: Jun. 12, 2018

(54) POSITIVE ELECTRODE ACTIVE MATERIAL (71) Applicant: SEMICONDUCTOR ENERGY LABORATORY CO., LTD., Atsugi-shi, Kanagawa-ken (JP)

(72) Inventors: Akiharu Miyanaga, Kanagawa (JP); Junichi Koezuka, Kanagawa (JP); Masahiro Takahashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 394 days.

(21) Appl. No.: 14/698,896

(22) Filed: Apr. 29, 2015

(65) Prior Publication Data

US 2015/0263331 A1 Sep. 17, 2015

Related U.S. Application Data (63) Continuation of application No. 12/829,410, filed on Jul. 2, 2010, now abandoned.

(30) Foreign Application Priority Data

Jul. 10, 2009 (JP) ................................. 2009-164159

(51) Int. Cl.
*H01M 4/04* (2006.01)
*H01M 4/58* (2010.01)
(Continued)

(52) U.S. Cl.
CPC ............. *H01M 4/045* (2013.01); *C01B 25/45* (2013.01); *H01M 4/136* (2013.01);
(Continued)

(58) Field of Classification Search
CPC ............... H01M 4/045; H01M 4/5825; H01M 2004/028
See application file for complete search history.

(56) References Cited

U.S. PATENT DOCUMENTS

| 5,720,859 A | 2/1998 | Czubarow et al. |
| 5,770,018 A | 6/1998 | Saidi |
| | (Continued) | |

FOREIGN PATENT DOCUMENTS

| EP | 0913876 A | 5/1999 |
| EP | 2239806 A | 10/2010 |
| | (Continued) | |

OTHER PUBLICATIONS

Machine translation of JP2007012491, publication date Jan. 18, 2007.*

(Continued)

*Primary Examiner* — Jun Li
(74) *Attorney, Agent, or Firm* — Nixon Peabody LLP; Jeffrey L. Costellia (57) ABSTRACT

A highly effective positive electrode is obtained by using a material such as Na which is an inexpensive abundant resource. A positive electrode active material of sodium transition metal phosphate of olivine structure in which the sodium transition metal phosphate of olivine structure includes, a phosphorus atom that is located at the center of a tetrahedron having an oxygen atom in each vertex, a transition metal atom that is located at the center of a first octahedron having an oxygen atom in each vertex; and a sodium atom that is located at the center of a second octahedron having an oxygen atom in each vertex, and adjacent sodium atoms are arranged one-dimensionally in a <010> direction.

8 Claims, 4 Drawing Sheets

(51) Int. Cl.
*H01M 4/136* (2010.01)
*C01B 25/45* (2006.01)
*H01M 10/054* (2010.01)
*H01M 4/02* (2006.01)

(52) U.S. Cl.
CPC ........ *H01M 4/5825* (2013.01); *H01M 10/054* (2013.01); *H01M 2004/028* (2013.01)

(56) References Cited

U.S. PATENT DOCUMENTS

| | | | |
|---|---|---|---|
| 5,951,831 | A | 9/1999 | Godber et al. |
| 5,985,237 | A | 11/1999 | Lu et al. |
| 6,348,182 | B1 | 2/2002 | Lu et al. |
| 6,872,492 | B2 | 3/2005 | Barker et al. |
| 7,060,238 | B2 | 6/2006 | Saidi et al. |
| 7,759,008 | B2 | 7/2010 | Barker et al. |
| 8,313,719 | B2 | 11/2012 | Barker et al. |
| 2003/0027049 | A1* | 2/2003 | Barker .................. C01B 25/455 429/231.95 |
| 2004/0016632 | A1 | 1/2004 | Barker |
| 2005/0121307 | A1 | 6/2005 | Hargett, Jr. et al. |
| 2005/0196334 | A1* | 9/2005 | Saidi ........................ C01B 25/45 423/306 |
| 2007/0072034 | A1 | 3/2007 | Barker et al. |
| 2007/0160519 | A1 | 7/2007 | Barker et al. |
| 2008/0153002 | A1* | 6/2008 | Nazar .................... C01B 25/455 429/221 |
| 2009/0117020 | A1 | 5/2009 | Manthiram et al. |
| 2009/0184296 | A1 | 7/2009 | Isono et al. |
| 2010/0086461 | A1* | 4/2010 | Chung .................... C01B 25/37 423/306 |
| 2010/0086855 | A1 | 4/2010 | Kohmoto et al. |
| 2010/0304217 | A1 | 12/2010 | Suzuki et al. |
| 2010/0323231 | A1 | 12/2010 | Sakai et al. |
| 2011/0008233 | A1* | 1/2011 | Miyanaga ............... C01B 25/45 423/306 |
| 2011/0031105 | A1* | 2/2011 | Miyanaga ............... C01B 25/37 204/157.43 |
| 2011/0052986 | A1 | 3/2011 | Barker et al. |
| 2011/0065004 | A1* | 3/2011 | Murakami .......... H01M 4/1397 429/231.1 |

FOREIGN PATENT DOCUMENTS

| | | |
|---|---|---|
| JP | 10-152326 A | 6/1998 |
| JP | 11-511290 | 9/1999 |
| JP | 2004-533706 | 11/2004 |
| JP | 2007-012491 A | 1/2007 |
| JP | 2008-535182 | 8/2008 |
| JP | 2008-260666 A | 10/2008 |
| JP | 2009-104970 A | 5/2009 |
| JP | 2009-206085 A | 9/2009 |
| WO | WO-2002/097907 | 12/2002 |
| WO | WO-2006/105253 | 10/2006 |
| WO | WO-2008/109602 | 9/2008 |
| WO | WO-2009/053823 | 4/2009 |
| WO | WO-2009/096335 | 8/2009 |

OTHER PUBLICATIONS

Burba.C et al., "Vibrational spectroscopic investigation of structurally-related $LiFePO_4$, $NaFePO_4$, and $FePO_4$ compounds", Spectrochimica Acta Part A, 2006, No. 65, pp. 44-50.

Feng.P et al., "Synthesis and Characterizations of a Polymorphic Sodium Cobalt Phosphate with Edge-Sharing $CO^{2+}$ Octahedral Chains", Jounal of Solid State Chemistry, 1997, vol. 131, pp. 160-166.

Feng.P et al., "Synthesis, Crystal Structure, and Magnetic Properties of a New Polymorphic Sodium Cobalt Phosphate with Trigonal Bipyramidal $CO^{2+}$ and a Tunnel Structure", Journal of Solid State Chemistry, 1997, vol. 129, pp. 328-333.

Erragh.F et al., "Sodium Nickel Polyphosphate", Acta. Cryst.(Acta Crystallographica Section), 1998, vol. C54, pp. 1746-1747.

Kang.B et al., "Battery Materials for Ultrafast Charging and Discharging", Nature, Mar. 12, 2009, vol. 458, No. 7235, pp. 190-193.

Yang.S et al., "Hydrothermal Synthesis of Lithium Iron Phosphate Cathodes", Electrochemistry Communications, 2001, vol. 3, No. 9, pp. 505-508.

Murugan.A et al., "One-pot microwave-hydrothermal synthesis and characterization of carbon-coated $CiMPO_4$(M= Mn, Fe, and Co) Cathodes", J. Electrochem. Soc. (Journal of the Electrochemical Society), 2009, vol. 156, No. 2, pp. A79-A83.

Chen.J et al., "Hydrothermal synthesis of cathode materials", Journal of Power Sources, 2007, vol. 174, pp. 442-448, Elsevier.

Yamada.A et al., "Optimized $LiFePO_4$ for Lithium Battery Cathodes", J. Electrochem. Soc. (Journal of the Electrochemical Society), 2001, vol. 148, No. 3, pp. A224-A229.

Korean Office Action (Application No. 2010-0065310) dated Sep. 30, 2016.

* cited by examiner

POSITIVE ELECTRODE ACTIVE MATERIAL

BACKGROUND OF THE INVENTION

1. Field of the Invention

The present invention relates to an active material used for an electrode of a secondary battery.

2. Description of the Related Art

In recent years, with an increase of environmental engineering, development of power generating technologies which pose less burden on the environment (e.g., solar power generation) than conventional power generation methods has been actively conducted. Concurrently with the development of power generation technology, development of power storage technology has also been underway.

A power storage technology includes, for instance, a lithium ion secondary battery. Lithium ion secondary batteries are widely prevalent since their energy density is high and because they are well suited for miniaturization. As an active material used for a positive electrode of the lithium ion secondary battery, there is olivine structure $LiFePO_4$, for example.

Olivine structure $LiFePO_4$ (lithium iron phosphate) has favorable characteristics since the lithium atoms (Li) are arranged in one direction without being inhibited by other atoms. However, since Li is a rare metal, its reserves are few and it is expensive. Therefore, sodium (Na), which is plentiful at low cost, is being considered as a substitute material for Li.

Conventional $NaMPO_4$ (M is Mn, Fe, Co or Ni) takes a maricite structure (for reference, see Patent Document 1 and Patent Document 2). In the maricite structure, since the sodium atoms contributing to electrical conduction are not arranged in one direction without being inhibited by other atoms, the drift of the applied field effect state of sodium ions (Na ions) is small, thus there is the problem that favorable characteristics can not be obtained.

REFERENCE

[Patent Document 1] Japanese Published Patent Application No. 2008-260666

[Patent Document 2] Japanese Published Patent Application No. 2009-104970

SUMMARY OF THE INVENTION

It is an object of an embodiment of the present invention to provide a highly efficient positive electrode using Na which is a low cost abundant resource.

An embodiment of the present invention is a positive electrode active material which includes sodium transition metal phosphate having the olivine type structure, sodium atoms being arranged in one direction without being inhibited by other atoms.

An embodiment of the present invention is a positive electrode active material which includes sodium transition metal phosphate having an olivine structure, a phosphorus atom located at the center of a tetrahedron having an oxygen atom in each vertex, a transition metal atom located at the center of a first octahedron having an oxygen atom in each vertex, and a sodium atom located at the center of a second octahedron having an oxygen atom in each vertex, and adjacent sodium atoms arranged in one direction (<010> direction) without being inhibited by other atoms.

In the abovementioned structure for the positive electrode active material, the aforesaid transition metal may be iron, nickel, cobalt, or manganese, and the aforesaid sodium transition metal phosphate may be sodium iron phosphate, sodium nickel phosphate, sodium cobalt phosphate, and sodium manganese phosphate.

A highly efficient positive electrode material using Na, which is a low cost abundant resource, can be provided.

DETAILED DESCRIPTION OF THE INVENTION

Embodiments of the present invention are described with reference to the drawings. However, the present invention is not limited to the following description. The present invention can be implemented in various different ways and it will be readily appreciated by those skilled in the art that various changes and modifications are possible without departing from the spirit and the scope of the present invention. Therefore, unless such changes and modifications depart from the scope of the invention, they should be construed as being included therein. Note that reference numerals denoting the same portions are commonly used in different drawings.

Embodiment 1

Figure 3:
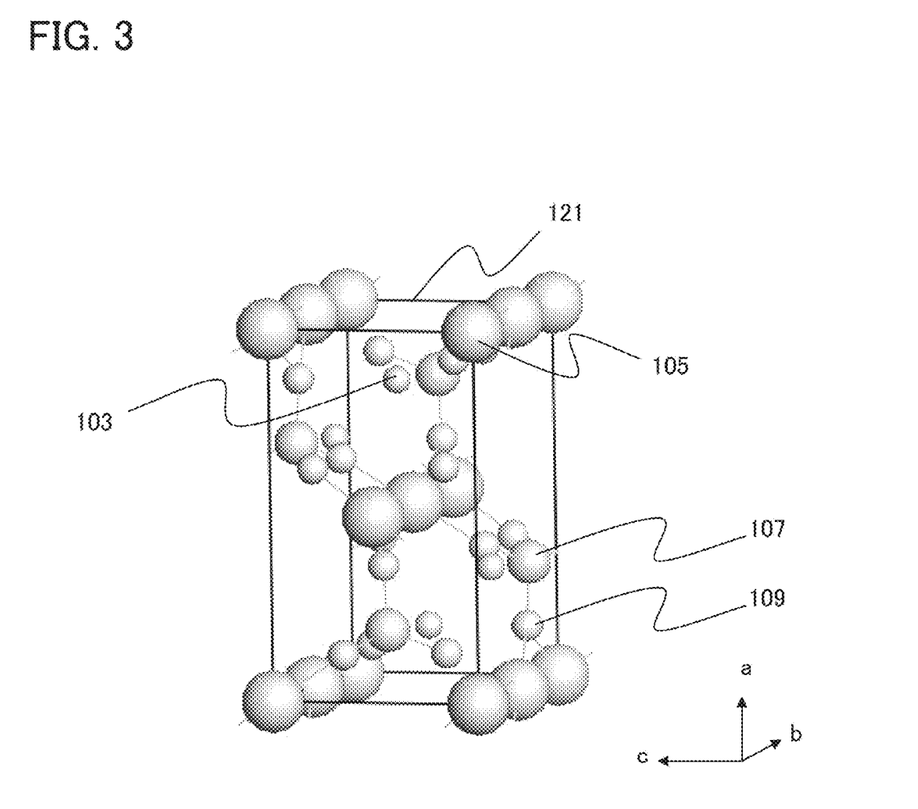
FIG. 3 is a schematic diagram of a crystal structure for sodium iron phosphate having a maricite structure.

In this embodiment, there is an embodiment of the present invention regarding a positive electrode active material which will be described using FIG. 1 and FIG. 3.

An embodiment of the positive electrode active material shown in this embodiment is sodium transition metal phosphate ($NaMPO_4$) in which a transition metal (M) such as iron, cobalt, nickel, or manganese can be used. Herein is a description using sodium iron phosphate ($NaFePO_4$) in which iron is used for example as the transition metal (M).

Figure 1:
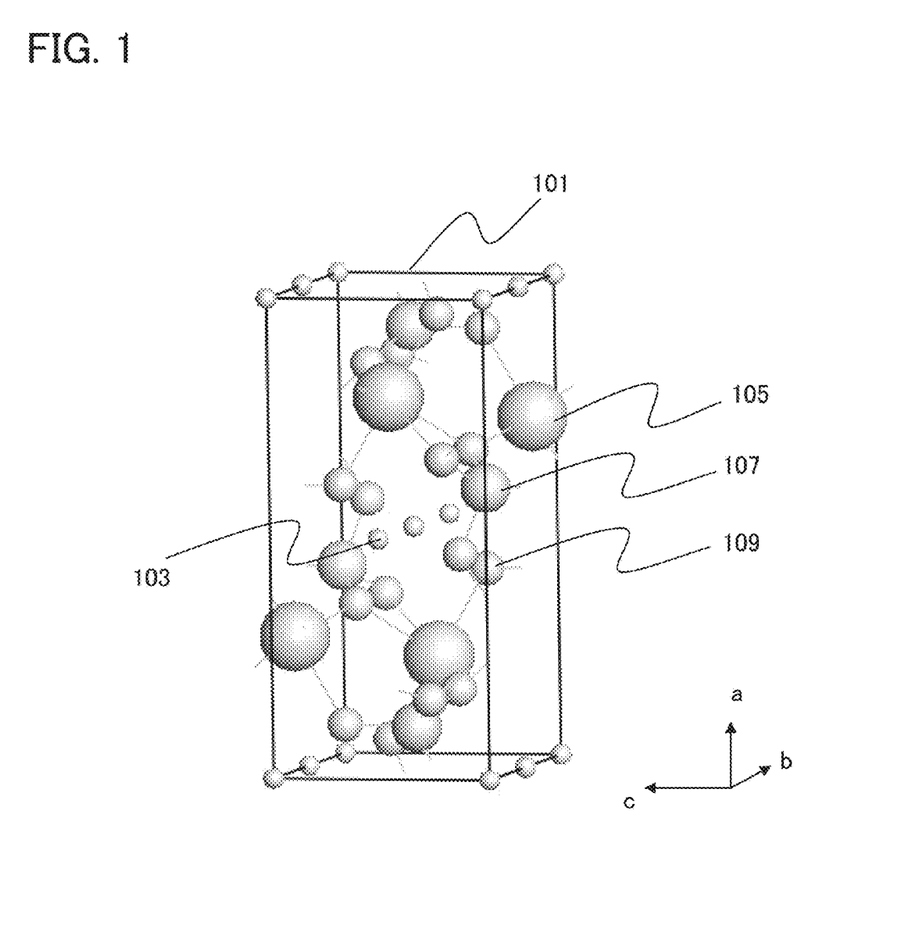
FIG. 1 is a schematic diagram of a crystal structure for sodium iron phosphate having an olivine structure.

In FIG. 1, a unit cell 101 of sodium iron phosphate ($NaFePO_4$) of olivine structure is shown. Sodium iron phosphate of olivine structure is an orthorhombic crystal structure, and includes four formula units of sodium iron phosphate ($NaFePO_4$) within a unit cell. The basic framework of the olivine structure is a hexagonal close-packed structure of an oxide ion, in which a sodium atom, an iron atom and a phosphorus atom are located in the gaps of the hexagonal close-packed structure.

Further, the olivine structure of sodium iron phosphate ($NaFePO_4$) has a tetrahedral site and two kinds of octahedral sites. The tetrahedral site has four oxygen atoms in the vertices. The octahedral sites have six oxygen atoms in the vertices. Phosphorus atom 107 is located at the center of the tetrahedral site, and sodium atom 103 or iron atom 105 is located at the center of the octahedral sites. The octahedral site with the sodium atom 103 located at the center is called a M1 site, and the octahedral site with the iron atom 105 located at the center is called a M2 site. The adjacent M1 sites are arranged in a b-axis direction without being inhibited by other atoms. That is, sodium atoms each located in each of the adjacent M1 sites are arranged in one direction (<010> direction) without being inhibited by other atoms. Note here, bonds between the sodium atoms 103 and other atoms or ions are not shown with a line in FIG. 1.

The iron atoms 105 of adjacent M2 sites are bonded in a zigzag shape with an oxygen atom 109 interposed therebetween. Then, the oxygen atom 109 bonded between the iron atoms 105 of the adjacent M2 sites, is also bonded to the phosphorus atom 107 of the tetrahedral site. Thus, the bond between the iron atom and the oxygen atom and the bond between the oxygen atom and the phosphorus atom are continuous.

Note that the sodium iron phosphate of olivine structure may have distortion. Further, regarding the sodium iron phosphate, the composition ratio of sodium, iron, phosphorus, and oxygen is not limited to 1:1:1:4. Also, as the transition metal (M) of the sodium transition metal phosphate ($NaMPO_4$), a transition metal which has an ionic radius that is larger than that of a Na ion may be used.

In a positive electrode active material shown in FIG. 1, since even iron phosphate alone is stable, diffusion of sodium is easy. For this reason, the sodium capable of diffusion contribute to an electrical conduction. Furthermore, since the sodium atoms which contribute to an electrical conduction is arranged in one direction and in a b-axis direction without being inhibited by other atoms, the diffusibility of the Na ions in the b-axis direction is high. That is, since the diffusive resistance of the Na ions can be reduced, the drift of the Na ions is large. Also, since sodium is used, the positive electrode active material is highly practical at low cost. For this reason, by using sodium iron phosphate in the positive electrode active material, the internal resistance of a secondary battery can be reduced, and its output power can be increased.

Here, as a comparative example, the sodium iron phosphate of maricite structure will be described. In FIG. 3, a unit cell 121 for sodium iron phosphate of maricite structure ($NaFePO_4$) is shown. The sodium iron phosphate of maricite structure includes an octahedral site having a sodium atom 103 in the center, an octahedral site having an iron atom 105 in the center, and a tetrahedral site having a phosphorus atom 107 in the center. Further, iron atoms 105 are arranged in one direction and in a b-axis direction without being inhibited by other atoms, and sodium atoms 103 and oxygen atoms 109 are alternately arranged. Here, since sodium atoms contributting to electrical conduction are not arranged in one direction without being inhibited by other atoms, a diffusibility of the Na ion is low. That is to say, a diffusive resistance of the Na ion is high, and a drift of the Na ion is small.

From the above, as shown in FIG. 1, by sodium atoms which contribute to an electrical conduction being arranged in one direction and in a <010> direction (b-axis direction) without being inhibited by other atoms, at least, the diffusibility of the Na ions is increased. Namely, since the diffusive resistance of the Na ions can be reduced, the drift of the Na ions becomes larger. In addition, since at least the Na ions are used as ions which contribute to an electrical conduction, a positive electrode active material is highly practical at low cost. For this reason, by using sodium iron phosphate or sodium lithium iron phosphate in the positive electrode active material, an internal resistance of the secondary battery is reduced, and a high output power can be achieved.

Next, a manufacturing method for the positive electrode active material of the secondary battery of the present embodiment will be explained.

First, a transition metal phosphate of the olivine structure is prepared. Here, as an example, the case of manufacturing an iron phosphate of olivine structure is explained but is not limited thereto; thus, if of olivine structure, another transition metal (e.g., nickel, cobalt, or manganese) may be substituted for the iron.

The iron phosphate of olivine structure can be manufactured by mixing, for example, iron or a material including iron with a phosphate or a material including a phosphate, and then causing a reaction.

As the material including iron, for example, an iron oxyhydroxide, iron(II) oxide, iron(III) oxide, iron(II) oxalate dihydrate, iron chlorides and the like can be used. Alternatively, a material including iron that has a microcrystal structure can be used. By using the material including iron that has a microcrystal structure, a particle size of the formed lithium iron phosphate can be approximately several nanometers.

As the material including a phosphate, for example, phosphorus pentoxide, diammonium hydrogen phosphate, or ammonium dihydrogen phosphate can be used. For example, it is preferred to use the phosphate or the phosphorus pentoxide since a strong acid condition can be maintained in a process of dissolving iron, and since the generation of the ammonia gas can be suppressed. For instance, when using an iron powder as the iron material, the iron powder is mixed with phosphorus pentoxide, pure water is added to the obtained mixture which is then left still and a reaction is caused, a first heat treatment is performed on the material that has been left still and underwent a reaction, and then the heat treated material is ground (mixed by grinding). Additionally, by performing a second heat treatment, iron phosphate of olivine structure is manufactured. Here, the first heat treatment may be performed until drying is completed; for example, the first heat treatment may be performed at 100° C. in atmospheric air for 24 hours, and a second heat treatment, for example, may be performed at 100° C. to 650° C. in atmospheric air for 12 hours.

Additionally, a third heat treatment is performed as a manufacturing step for an iron phosphate of olivine structure. The third heat treatment is, for example, a one stage temperature process which is from room temperature to a heat treatment "end temperature" (e.g., 100° C. to 800° C., more preferably 300° C. to 650° C.), in other words, it is preferable to increase a temperature continuously from room temperature until the "end temperature" is achieved. However, without being limited thereto, a two stage temperature process (pre-bake and main-bake) can also be performed. In the case of a two stage temperature process, for instance, as a first stage (pre-bake), a heat treatment is performed from room temperature to 300° C., and as a second stage (main-bake), a heat treatment of 300° C. to 800° C. is performed. In this way, the iron phosphate of olivine structure can be manufactured.

Next, Na ions are introduced to the iron phosphate of olivine structure which is manufactured as explained above.

Methods for introducing Na ions which can be used are, for example, while not particularly limited hereto, a method of impregnating the aforesaid iron phosphate of olivine structure with a solution including Na ions, or a method in which a sodium sheet is provided to a surface of the aforesaid iron phosphate and then left still and heated, or a voltage is applied. Note that according to the present embodiment, the sodium sheet comprises metallic sodium spread in a sheet form so as to have a thickness of 0.01 mm to 0.1 mm (e.g., a thickness of 0.05 mm). However, the thickness of the sodium sheet is not limited thereby, and the sodium sheet may have a suitable thickness as necessary.

Here, when the aforesaid iron phosphate compound of olivine structure is impregnated with the solution including Na ions, it is preferred that the solution including Na ions has a Na ion concentration in a range of 1 mol % to 10 mol %, and particularly in a range of 4 mol % to 6 mol %. As the solution including Na ions, for example, a solution including $NaClO_4$ can be used.

First, as described above, the transition metal phosphate of olivine structure is prepared, and by introducing Na ions to the prepared transition metal phosphate, the positive electrode active material of sodium transition metal phosphate can be manufactured while maintaining the olivine structure.

Embodiment 2

In the present embodiment, an embodiment of the present invention regarding a positive electrode active material, which is different from that of Embodiment 1, will be explained. A positive electrode active material shown in the present embodiment is sodium-lithium transition metal phosphate ($Na_xLi_{(1-x)}MPO_4$ (0<x<1)), and as the transition metal (M), iron, cobalt, nickel, manganese, and the like can be used. In other words, an aspect of differentiation from Embodiment 1 is that besides sodium, lithium is also included. Herein, sodium-lithium iron phosphate ($Na_xLi_{(1-x)}FePO_4$ (0<x<1)) using iron as the transition metal (M) is used for explanation.

Figure 2:
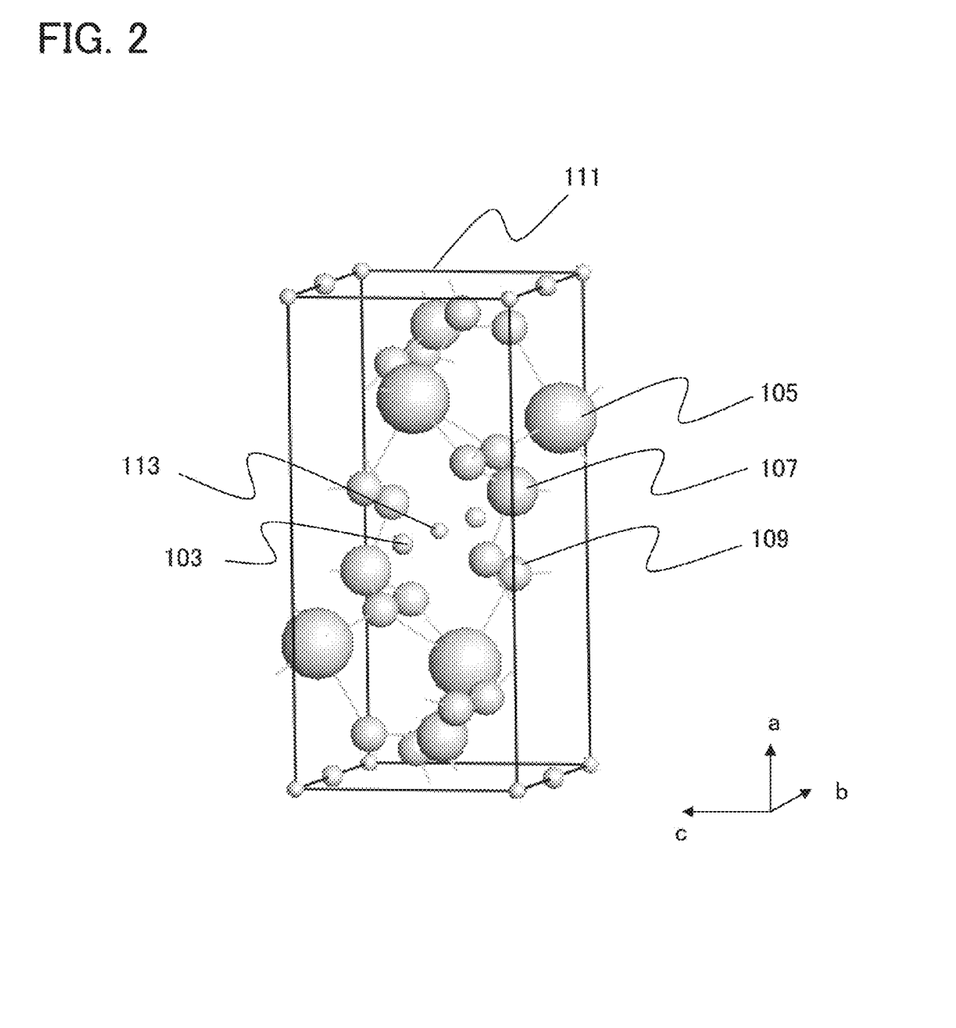
FIG. 2 is a schematic diagram of a crystal structure for sodium lithium iron phosphate having an olivine structure.

FIG. 2 shows a unit cell 111 for sodium-lithium iron phosphate ($Na_xLi_{(1-x)}FePO_4$ (0<x<1)) of olivine structure. Sodium-lithium iron phosphate of olivine structure is an orthorhombic crystal structure, and includes four formula units of sodium-lithium iron phosphate ($Na_xLi_{(1-x)}FePO_4$ (0<x<1)) within a unit cell.

Sodium atom 103 and lithium atom 113 of the sodium-lithium iron phosphate ($Na_xLi_{(1-x)}FePO_4$ (0<x<1)) are arranged in one direction and in a b-axis direction without being inhibited by other atoms. That is to say, the sodium atom 103 and the lithium atom 113 are arranged in one direction (<010> direction) without being inhibited by other atoms. Here, bonds between the sodium atoms 103 and other atoms and between the lithium atoms 113 and other atoms are not shown by lines in FIG. 2.

Note that the sodium-lithium iron phosphate of olivine structure may be distorted. Furthermore, regarding the sodium-lithium iron phosphate, the composition ratio of the sodium and the lithium, the iron, the phosphorus, and the oxygen is not limited to 1:1:1:4. As the transition metal (M) of the sodium-lithium transition metal phosphate ($Na_xLi_{(1-x)}MPO_4$ (0<x<1)), a transition metal which has an ionic radius that is larger than that of the Na ion and the lithium ion (Li ion) may be used.

In the positive electrode active material shown in FIG. 2, since even an iron phosphate alone is stable, diffusion of sodium and lithium is easy. For this reason, sodium and lithium capable of diffusion contribute to an electrical conduction. Furthermore, since the sodium atoms and the lithium atoms which contribute to the electrical conduction are arranged in one direction and in a b-axis direction without being inhibited by other atoms, the diffusibility of the Na ions and the Li ions in the b-axis direction is high. That is, since the diffusive resistance of the Na ions and the Li ions can be reduced, the drift of the Na ions and the Li ions is large. Also, since lithium is used with the sodium, the amount of lithium used can be reduced; thus, the positive electrode active material is highly practical at low cost. For this reason, by using sodium-lithium iron phosphate in the positive electrode active material, the internal resistance of a secondary battery is reduced, and a high output power can be obtained.

Next, a manufacturing method for the secondary battery positive electrode active material of the present embodiment will be explained.

First, a lithium transition metal phosphate of olivine structure is manufactured. Here, as an example, the case of manufacturing a lithium iron phosphate of olivine structure is explained, but not limited thereto; thus, if of olivine structure, a material including another transition metal (e.g., nickel, cobalt, and manganese) instead of the iron or a material including plural transition metals may be used.

The lithium iron phosphate of olivine structure can be manufactured by mixing, for example, lithium or a material including lithium, iron or a material including iron, and a phosphate or a material including a phosphate, and performing a heat treatment.

As the material including iron, for example, an iron oxyhydroxide, iron(II) oxide, iron(III) oxide, iron(II) oxalate dihydrate, iron chlorides, and the like can be used. Alternatively, a material including iron that has a microcrystal structure can be used. By using the material including iron that has a microcrystal structure, a particle size of the formed lithium iron phosphate can be approximately several nanometers.

As the material including lithium, for instance, lithium carbonate, lithium hydroxide, lithium hydroxide hydrate, lithium nitrite, and the like can be used. For example, the lithium carbonate is preferred for its low hygroscopic property.

As the material including a phosphate, for example, phosphorus pentoxide, diammonium hydrogen phosphate, or ammonium dihydrogen phosphate can be used.

For example, lithium iron phosphate is manufactured by mixing lithium carbonate, iron(II) oxalate dihydrate, and ammonium hydrogen phosphate, performing a first heat treatment on the obtained mixture, and additionally performing a second heat treatment. Here for instance, a ball mill is used to mix the materials. The first heat treatment is performed, for example at 350° C. for 10 hours, and the second heat treatment is performed, for example in an argon atmosphere at 600° C. for 10 hours.

Furthermore, the lithium iron phosphate of olivine structure can be manufacture by a first method having steps of: dissolving lithium or a material including lithium, iron or a material including iron, and phosphate or a material including phosphate in a solution; evaporating or nebulizing and drying the solution; and performing a heat treatment under a reducing atmosphere, or a second method having steps of: dissolving lithium or a material including lithium, iron or a material including iron, and phosphate or a material including phosphate in a solution; and performing a hydrothermal treatment. By manufacturing the lithium iron phosphate of olivine structure using the first or second method, a particle size can be approximately several tens of nanometers to several hundreds of nanometers. For example, by impregnating and mixing the material including iron with the solution including Li ions and phosphate ions and then performing a hydrothermal treatment, the lithium iron phosphate of olivine structure is manufactured using the second method. Here, the hydrothermal treatment is, for example, performed within a range of 150° C. to 200° C. Also, a heat treatment may be performed after the hydrothermal treatment. At such a time, the heat treatment is performed, for example, in a reducing atmosphere within a range of 500° C. to 700° C.

Next, a process for replacing at least a portion of Li ions with Na ions (hereafter, referred to as a sodium-lithium ion replacement process) is performed on the manufactured lithium iron phosphate of olivine structure.

Methods for the sodium-lithium ion replacement process, which can be used are a method of impregnating the manufactured lithium iron phosphate of olivine structure with the solution including Na ions as described above, and replacing the Li ions which form the lithium iron phosphate of olivine structure with the Na ions, or introducing Na ions by providing a sodium sheet to a surface of the lithium iron phosphate of olivine structure, which is then left still and heated, or a voltage is applied. However, as long as a method can replace at least a portion of the Li ions which form the lithium iron phosphate of olivine structure with the Na ions, the method is not particularly limited.

Here, when impregnating the aforesaid lithium iron phosphate of olivine structure with the solution including Na ions, it is preferred that the solution including Na ions has a Na ion concentration in a range of 1 mol % to 10 mol %, and particularly in a range of 4 mol % to 6 mol %. As the solution including Na ions, for example, a solution including $NaClO_4$ can be used.

Also, a heat treatment may be performed in the sodium-lithium ion replacement process. By performing the heat treatment, at least a portion of the Li ions can be more efficiently replaced with the Na ions. The heat treatment temperature at this time, for example, is preferably in a range of 300° C. to 400° C., and particularly preferable in a range of 330° C. to 350° C. Note that a heating time, for instance, is preferably 1 hour to 10 hours, and particularly preferable for 2 hours to 5 hours.

Also, in a method of manufacturing the positive electrode active material of the present embodiment, while not limited hereby, the sodium-lithium ion replacement process may be performed once after a battery is assembled. Here, the method of performing the sodium-lithium ion replacement process after a battery is assembled is explained next.

First, a lithium iron phosphate of olivine structure is manufactured in the similar manner as described above, and using the obtained lithium iron phosphate of olivine structure, a positive electrode is manufactured. Also, other than the positive electrode, a negative electrode and an electrolyte are prepared, and then combined with the manufactured positive electrode to manufacture a battery. Additionally, after at least a portion of the Li ions is extracted from the lithium iron phosphate of olivine structure by applying a voltage to the manufactured battery, by performing the sodium-lithium replacement process, at least a portion of the Li ions which forms the manufactured lithium iron phosphate can be replaced with Na ions.

As described above, first, the lithium iron phosphate of olivine structure is manufactured, and by replacing at least the portion of the Li ions which forms the manufactured lithium iron phosphate with Na ions, the positive electrode active material of the sodium-lithium iron phosphate of olivine structure can be manufactured. Moreover, replaced Li may be collected and reused.

Embodiment 3

A secondary battery using the positive electrode active material which is one embodiment of the present invention described in the above embodiments, is described in the present embodiment.

Figure 4:
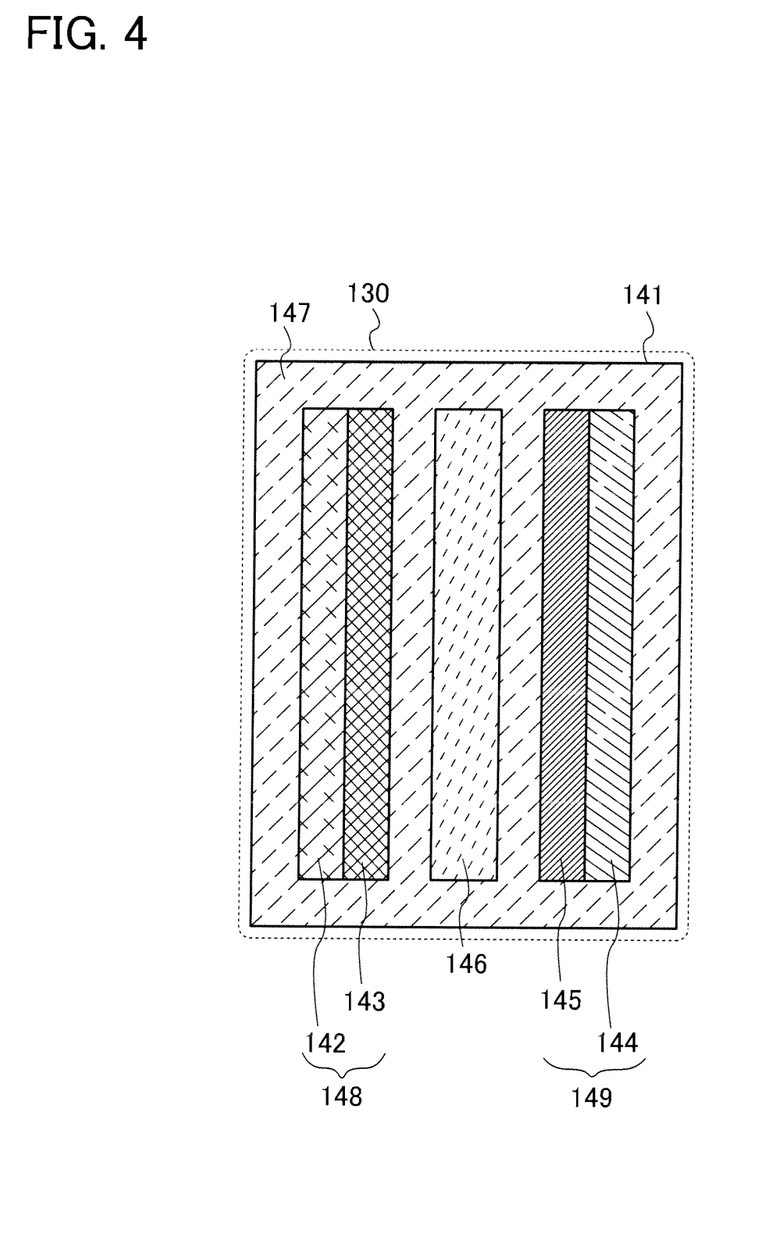
FIG. 4 is a schematic diagram of a structure for a secondary battery.

A structure of a secondary battery 130 is shown in FIG. 4. The secondary battery 130 has a housing 141, a positive electrode 148 including a positive electrode current collector 142 and a positive electrode active material 143, a negative electrode 149 including a negative electrode current collector 144 and a negative electrode active material 145, a separator 146 between the positive electrode 148 and the negative electrode 149, and an electrolyte 147.

As a material of the positive electrode current collector 142 of the secondary battery 130, an element such as aluminum (Al) and titanium (Ti), may be used alone or in a compound thereof.

The positive electrode active material in an embodiment of the present invention described in Embodiment 1 or Embodiment 2 is used as a material for the positive electrode active material 143 of the secondary battery 130.

As a material of the negative electrode current collector 144 of the secondary battery 130, an element such as copper (Cu), aluminum (Al), nickel (Ni), and titanium (Ti), may be used alone or in a compound thereof.

As a material of the negative electrode active material 145 of the secondary battery 130, a material capable of Na ion insertion and extraction or a compound of Na may be used. As the material capable of Na ion insertion and extraction, there is carbon, silicon, silicon alloy, and the like. As the carbon capable of Na ion insertion and extraction, there is a carbon material such as a fine graphite powder or a graphite fiber.

Note that when using silicon as the material for the negative electrode active material 145 of the secondary battery 130, microcrystalline silicon (microcrystal silicon) is deposited, and the microcrystalline silicon with its amorphous silicon removed by etching can be used. When amorphous silicon is removed from microcrystalline silicon, the surface area of the remaining microcrystalline silicon is increased.

Additionally, as the negative electrode active material 145 of the secondary battery 130, an alloy including tin (Sn) can be used.

Na ions are taken in and react with a layer formed of the aforesaid material capable of Na ion insertion and extraction, and the negative active material 145 is formed.

As the separator 146, paper, nonwoven fabric, a glass fiber, or a synthetic fiber such as nylon (polyamide), vinylon (also called vinalon) (a polyvinyl alcohol based fiber), polyester, acrylic, polyolefin, polyurethane, and the like may be used. However, a material which does not dissolve in the electrolyte 147, described later, should be selected.

More specific examples of materials for the separator 146 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, all of which can be used either alone or in a combination.

Also, the electrolyte 147 of the secondary battery 130 includes Na ions, and these Na ions are responsible for electrical conduction. The electrolyte 147 includes, for example, a solvent and a sodium salt dissolved in the solvent. The sodium salt, for example, can be a sodium salt such as sodium chloride (NaCl), sodium fluoride (NaF), sodium perchlorate ($NaClO_4$), and sodium fluoroborate ($NaBF_4$), which may be used alone or in combination in the electrolyte 147. Note that in the present embodiment, an electrolyte including a solvent and a sodium salt is used; however, a solid electrolyte may be used as necessary.

Examples of the solvent for the electrolyte 147 include cyclic carbonates such as ethylene carbonate (hereinafter abbreviated as EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane and the like; alkyl phosphate esters such as trimethyl phosphate, triethyl phosphate, and trioctyl phosphate and fluorides thereof, all of which can be used either alone or in combination.

As described above, the secondary battery using the secondary battery positive electrode active material of an embodiment of the present invention can be manufactured.

This application is based on Japanese Patent Application serial no. 2009-164159 filed with Japan Patent Office on Jul. 10, 2009, the entire contents of which are hereby incorporated by reference.

What is claimed is:

1. A method for manufacturing a positive electrode active material comprising:
   forming an iron phosphate having an olivine structure;
   providing a metallic sodium sheet on a surface of the iron phosphate; and
   performing a heat treatment on the sodium sheet and the iron phosphate.

2. The method according to claim 1, wherein at least one of phosphorus pentoxide, diammonium hydrogen phosphate, and ammonium dihydrogen phosphate is used in forming the iron phosphate.

3. The method according to claim 1, wherein a sodium iron phosphate having the olivine structure is formed by introducing sodium ions included in the sodium sheet into the iron phosphate.

4. The method according to claim 1,
   wherein the iron phosphate further comprises lithium ions, and
   wherein a sodium iron phosphate having the olivine structure is formed by replacing a portion of the lithium ions in the iron phosphate with sodium ions included in the sodium sheet.

5. A method for manufacturing a positive electrode active material comprising:
   forming an iron phosphate having an olivine structure;
   providing a metallic sodium sheet on a surface of the iron phosphate; and
   applying a voltage to the sodium sheet and the iron phosphate.

6. The method according to claim 5, wherein at least one of phosphorus pentoxide, diammonium hydrogen phosphate, and ammonium dihydrogen phosphate is used in forming the iron phosphate.

7. The method according to claim 5, wherein a sodium iron phosphate having the olivine structure is formed by introducing sodium ions included in the sodium sheet into the iron phosphate.

8. The method according to claim 5,
   wherein the iron phosphate further comprises lithium ions, and
   wherein a sodium iron phosphate having the olivine structure is formed by replacing a portion of the lithium ions in the iron phosphate with sodium ions included in the sodium sheet.

\* \* \* \* \*